United States Patent [19]

Kobayashi et al.

[11] Patent Number: 4,541,400
[45] Date of Patent: Sep. 17, 1985

[54] AIR INTAKE SIDE SECONDARY AIR SUPPLY SYSTEM FOR AN INTERNAL COMBUSTION ENGINE

[75] Inventors: Hideo Kobayashi, Kawagoe; Yohji Fukutomi, Sayama, both of Japan

[73] Assignee: Honda Giken Kogyo Kabushiki Kaisha, Tokyo, Japan

[21] Appl. No.: 651,952

[22] Filed: Sep. 19, 1984

[30] Foreign Application Priority Data

Sep. 20, 1983 [JP] Japan .................. 58-145250[U]

[51] Int. Cl.³ .................................... F02M 23/04
[52] U.S. Cl. .................................... 123/589; 123/327
[58] Field of Search ......... 123/327, 339, 585, 587–589

[56] References Cited

U.S. PATENT DOCUMENTS 4,325,348 4/1982 Abe et al. .................. 123/588
4,335,699 6/1982 Totsune et al. .................. 123/587
4,483,308 11/1984 Hasegawa .................. 123/589

Primary Examiner—William A. Cuchlinski, Jr.

[57] ABSTRACT

An air intake side secondary air supply system for an internal combustion engine includes an air control valve for controlling the amount of the secondary air and first and second pressure supply passages for respectively supplying a first control pressure for opening the air control valve and a second control pressure for closing the air control valve. A surge tank is provided in the first pressure supply passage for reducing the pulsation of pressure level and further the first and second pressure supply passages are made so that only the first control pressure is supplied through the first pressure supply passage and only the second control pressure is supplied through the second pressure supply passage. Thus, the delay of the closure of the air control valve which might cause unstable engine operation when the engine is decelerating is alleviated.

2 Claims, 5 Drawing Figures

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air-fuel ratio control system for an internal combustion engine, and more specifically to the so-called air intake side secondary air supply system for an internal combustion engine.

2. Description of Background Information

In an internal combustion engine provided with a three-way catalytic converter in the exhaust system, the air-fuel ratio of the engine is controlled around a stoichiometric value (14.7:1 for example) by a feedback control in accordance with the composition of the exhaust gas and operating conditions of the engine since an optimum operation of the three-way catalytic converter is enabled at the stoichiometric air-fuel ratio. The air intake side secondary air supply system is a system in which the air-fuel ratio is controlled by varying the amount of a secondary air through a secondary air passage connected to the carburetor on the downstream side of the throttle valve. As an example, Japanese Patent Application No. 57-200137 of the same applicant discloses a system in which an air control valve whose opening degree varies with the magnitude of a vacuum applied to the vacuum chamber thereof is provided in the air intake side secondary air supply passage communicated to the intake manifold on the downstream side of the throttle valve. In this system, an integral control of the air-fuel ratio is performed in such a manner that the air-fuel ratio is detected from the oxygen concentration of exhaust gas to produce an air-fuel ratio signal, and one of first and second control pressures respectively for gradually increasing the sectional area of the air intake side secondary air passage and for gradually decreasing the sectional area thereof, is supplied to the pressure chamber of the air control valve according to the content of the air-fuel ratio signal.

In this system, a constant vacuum or a control vacuum varying with the operating state of the engine is used as the first control pressure, and an atmospheric pressure is used as the second control pressure. The vacuum and the atmospheric pressure are switched by a three-way valve in accordance with the content of the air-fuel ratio signal and applied alternatively and intermittently to the vacuum chamber of the air control valve via a pressure passage. Thus, the air intake side secondary air is continuously supplied to the engine and the air-fuel ratio is controlled to the stoichiometric value by the feedback operation.

In addition, in the air intake side secondary air supply system, an open loop control in which the air-fuel ratio is controlled to the rich side is selected during a low load operation of the engine such as in a period of deceleration of the engine, because the combustion condition tends to be unstable in such a period. In the case of the open loop control, the atmospheric pressure which is from the three-way solenoid valve is continuously supplied to the pressure chamber of the air control valve via a pressure passage. Thus, the air control valve is closed and the supply of the secondary air is stopped.

In this operation, at a time when the vacuum is stopped and the supply of the atmospheric pressure to the pressure chamber of air control valve is started for the enrichment of the air-fuel ratio, the pressure level within the vacuum chamber gradually decreases to reach the atmospheric pressure due to the effect of a residual vacuum of the pressure chamber. Thus, there is some delay of the closure of the air control valve after the start of the application of the atmospheric pressure because of the integral operation. Moreover, if a surge tank is provided in the pressure supply passage for supressing the pulsation of the pressure, the residual vacuum in the surge tank will have significant affect on the length of time of the closure of the air control valve.

As an example, when the throttle valve is closed so that the engine operation is shifted from an ordinary operating condition to a decelerating condition, i.e., when an operating condition in which the air-fuel ratio is to be controlled to the rich side is started, the air control valve may remain open a long time. As a result, the secondary air is supplied to the engine to produce an over lean mixture which may result in an engine stall.

On the other hand, when the engine operation is shifted from the decelerating condition to the accelerating condition, i.e., when the feedback control of air-fuel ratio is started, the opening of the air control valve is delayed by the effect of the residual atomspheric pressure in the surge tank, and an excessively long time will be required before the air-fuel ratio is controlled to the stoichiometric value.

Thus, if a surge tank is provided in the pressure passage, it is difficult to avoid such disadvantages in the air-fuel ratio feedback control operation.

SUMMARY OF THE INVENTION

An object of the present invention is therefore to provide an air intake side secondary air supply system with a surge tank for supressing the pulsation of the pressure, in which the opening and the closing of the air control valve are free of the adverse effect of the residual pressure in the surge tank.

According to the present invention, the air intake side secondary air supply system includes first and second pressure supply passages communicated with the pressure chamber of the air control valve for respectively supplying a first control pressure capable of opening the air control valve and a second control pressure capable of closing the air control valve, to the pressure chamber of the air control valve, and a surge tank provided in the first pressure passage, wherein the first pressure supply passage takes the form of a one-way pressure supply passage for supplying only the first control pressure to the pressure chamber of the air control valve, and the second pressure supply passage takes the form of a one way pressure supply passage for supplying only the second control presure to the pressure chamber of the air control valve.

Further scope and applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

DETAILED DESCRIPTION OF A PREFERRED EMBODIMENT

The preferred embodiment of the present invention will be described hereinafter with reference to the accompanying drawings.

Figure 1:
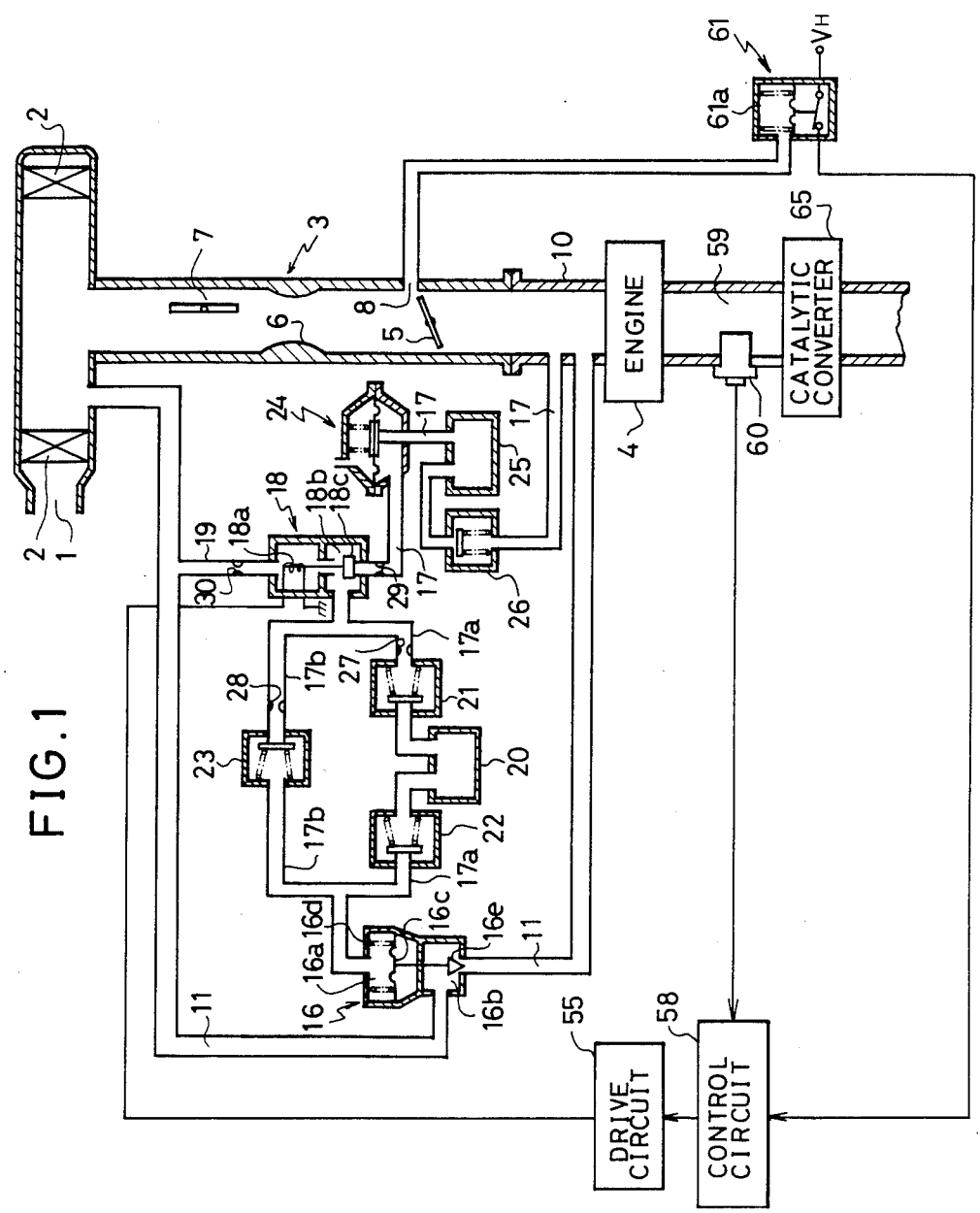
FIG. 1 is a schematic diagram illustrating the construction of an embodiment of the air intake side secondary air supply system of the present invention.

In FIG. 1, the intake air taken at an atmospheric air inlet port 1 is drawn into an internal combustion engine through an air cleaner 2, and a carburetor 3. The carburetor 3 has a throttle valve 5 and a venturi 6 formed on the upstream side of the throttle valve 5. A choke valve 7 is provided on the upstream side of the venturi 6. In the bore of the carburetor, a vacuum detection hole 8 is provided adjacent to the throttle valve 5 in such a manner that it is on the upstream side of the throttle valve 5 when it is closed and on the downstream side of the throttle valve 5 when it is opened. An air intake side secondary air supply passage 11 is provided to make a communication between the inside of the air cleaner 2 in the vicinity of an air outlet port, and an intake manifold 10, downstream of the throttle valve 5. The secondary air supply passage 11 is provided with an air control valve 16 which is made up of a vacuum chamber 16a, a valve chamber 16b, a diaphragm 16c, a valve spring 16d, and a valve element 16e having a tapered form. The air control valve 16 varies the sectional area of the secondary air supply passage 11 in accordance with the magnitude of a vacuum supplied to the vacuum chamber 16a, so that the sectional area increases with the magnitude of the vacuum.

The vacuum chamber 16a is communicated with the intake manifold 10 by means of a vacuum supply passage 17. The vacuum supply passage 17 is provided with a solenoid valve 18 which includes a solenoid 18a, a valve chamber 18b forming a part of the vacuum supply passage 17, and a valve element 18c magnetically connected to the solenoid 18a. The valve chamber 18b is communicated with the atmosphere via an atmospheric pressure supply passage 19. When the solenoid 18a is deenergized, the vacuum supply passage 17 is closed and a part of the vacuum supply passage 17 on the side of the vacuum chamber 16a is communicated with the atmospheric pressure supply passage via the valve chamber 18b. The part of the vacuum supply passage 17 on the side of the vacuum chamber 16a is divided into two pressure supply passages 17a and 17b. The pressure supply passage 17a is provided with a surge tank 20 and a first non-return valve 21 and a second non-return valve 22 on both sides of the surge tank 20. The non-return valves 21 and 22 are arranged so as to allow only an air flow from the vacuum chamber 16a directed to the solenoid valve 18, i.e., the vacuum directed to the vacuum chamber 16a. On the other hand, the pressure supply passage 17b is provided with a third non-return valve 23 which is arranged to allow only an air flow directed to the vacuum chamber 16a, that is, the flow of the atmospheric air directed to the vacuum chamber 16a. A part of the vacuum supply passage 17 on the side of the intake manifold from the solenoid valve is provided with a constant vacuum control valve 24, a storage tank 25 and a non-return valve 26 in this order, from the solenoid valve 18. The constant vacuum control valve 24 is adapted to stabilize the magnitude of the vacuum supplied from the intake manifold 10 to a value Pr. The non-return valve 26 is adapted to allow only the flow of the air directed to the intake manifold 10. In the pressure supply passages 17a and 17b on the side of the solenoid valve 18 from the non-return valve 21 and the non-return valve 23 respectively, there are provided orifices 27 and 28. Also, an orifice 29 is provided in the vacuum supply passage 17 between the solenoid valve 18 and the constant vacuum control valve 24. Further, an orifice 30 is provided in the atmospheric pressure supply passage 19.

The solenoid 18a of the solenoid valve 18 is connected to a control circuit 58 through a drive circuit 55. The control circuit 58 is further provided with an output signal of an oxygen sensor 60 which is mounted in an exhaust manifold 59 and produces an output signal having a level $VO_2$ corresponding to an oxygen concentration of an exhaust gas and which increases with the oxygen concentration. A vacuum swtich 61 is also connected to the control circuit 58. The vacuum switch 61 is provided for detecting the magnitude of the engine load in terms of the magnitude of the vacuum Pc in the vacuum detection hole 8. When the magnitude of the vacuum Pc supplied to a vacum chamber 61a thereof is smaller than a predetermined level, the vacuum switch 61 turns "on" and a high level signal $V_H$ corresponding to the logic "1" is supplied to the control circuit 58.

Figure 2:
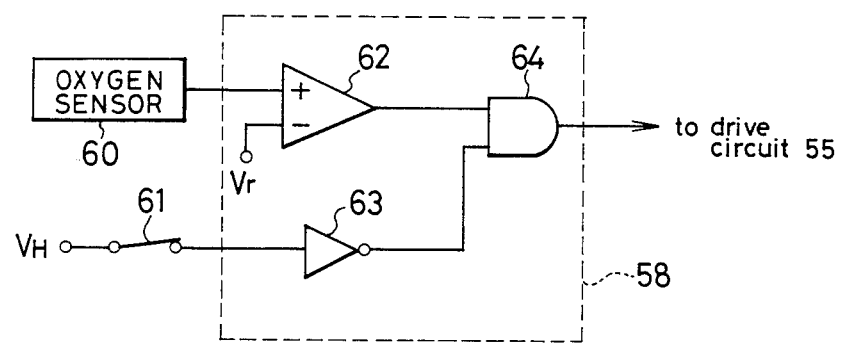
FIG. 2 is a block diagram showing the construction of the control circuit of the system shown in FIG. 1.

As shown in FIG. 2, the control circuit 58 is made up of a comparator for comparing the output signal $VO_2$ of the oxygen sensor 60 with a predetermined reference voltage Vr, an inverter connected to an output terminal of the vacuum switch 61, and an AND circuit 64 for the calculation of the logical AND between the output signal of the comparator 62 and the output signal of the inverter 63.

The operation of the air intake side secondary air supply system of the invention having the above construction will be explained hereinafter.

In the control circuit 58, when the air-fuel ratio is rich, the output signal level $VO_2$ of the oxygen sensor 60 becomes higher than the reference level Vr ($VO_2 \geq Vr$). Therefore, the comparator 62 produces the high level output signal. Conversely, if the air-fuel ratio is lean, the output signal level $VO_2$ of the oxygen sensor becomes lower than the reference voltage Vr ($VO_2 < Vr$). In this condition, the comparator 62 produces the low level output signal. On the other hand, when the feedback control of the air-fuel ratio is performed with open throttle valve 5, the vacuum chamber 61a is supplied with the vacuum Pc to turn off the vacuum switch 61. In this state, with the application of the low level output signal of the vacuum switch 61, the inverter 63 produces the high level output signal. Accordingly, the output signal of the AND citcuit 64 varies in the same manner as the output signal of the comparator 62. Thus, when the rich air-fuel mixture is detected from the level of the output signal of the oxygen sensor 60, the AND circuit 64 produces the high level output signal which in turn is supplied to the drive circuit 55 as a rich signal. When the air-fuel ratio is detected to be lean from the output signal of the oxygen sensor, the AND circuit 64 produces a low level output signal to be supplied to the drive circuit 55 as a lean signal.

When the lean signal is supplied to the drive circuit 55, the solenoid 18a of the solenoid valve 18 is deenergized, thus the solenoid valve 18 is made inoperative. Conversely, when the rich signal is applied, the solenoid 18a is energized and the solenoid valve 18 is made operable.

In response to the start of the operation of the solenoid valve 18 from the inoperative state, the communication through the vacuum supply passage 17 is made and the passage to the atmospheric pressure supply passage 19 is closed at the same time. Therefore, the vacuum Pr from the constant vacuum control valve 24 is supplied to the vacuum chamber 16a through the orifice 27 of the pressure supply passage 17a, non-return valve 21, surge tank 20, and a non-return valve 22. Since the pressure within the vacuum chamber 16a gradually increases to reach the vacuum Pr due to the effect of the residual atmospheric pressure in the vaccum chamber 16a and the effect of the orifices 27 and 29, the opening degree of the air control valve 16, that is, the sectional area of the air intake side secondary air passage 11 is gradually increased. Thus, the amount of the air intake side secondary air is gradually increased. In this state, since the non-return valve 23 is closed by the vacuum Pr, the pressure supply passage 17b is closed.

When, on the other hand, the solenoid valve 18 is made inoperative from the operating state, the vacuum supply passage 17 is closed and the atmospheric pressure supply passage 19 is communicated with the pressure supply passage 17b on the side of the vacuum chamber 16a. Therefore, the atmospheric pressure is supplied to the vacuum chamber 16a through the atmospheric pressure 19, solenoid valve 18, and the non-return valve 23 of the pressure supply passage 17b. Since the pressure in the vacuum chamber 16a gradually approaches to the atmospheric pressure level due to the effect of the residual vacuum in the vacuum chamber and the effect of the orifices 28 and 30, the opening degree of the air control valve is gradually decreased to reduce the amount of the air intake side secondary air.

At a time when the pressure in the vacuum chamber 16a has become substantially equal to the atmospheric pressure, the air control valve 16 is closed to stop the communication through the air intake side secondary air supply passage 11. Thus the supply of the secondary air is stopped. In this state in which the solenoid valve 18 is unoperated, the non-return valve 21 is closed and in turn the pressure supply passage 17 is closed. Thus the atmospheric pressure is supplied to the vacuum chamber 16a without passing through the surge tank 20.

Therefore, when the air-fuel ratio is controlled to be at the stoichiometric value, the rich signal and the lean signal are produced alternatively without interruption. Therefore, in the air intake side secondary air supply passage 11, the amount of the secondary air is gradually increased during the presence of the rich signal, and gradually decreased during the presence of the lean signal. Thus, the integral (I) control is performed.

When, on the other hand, the operating state of the engine is turned to the decelerating state as the result of the closure of the throttle valve, the magnitude of the vacuum Pc supplied from the vacuum detection hole 8 to the vacuum switch 61 becomes smaller than the predetermined level and the high level output signal of the vacuum switch 61 is applied to the inverter 63. As a result, the output signal level of the inverter 63 turns to the low level. In this state, the AND circuit 64 provides the low level signal to the driving circuit 55 regardless of the level of the output signal of the comparator 62, that is, the output signal level of the oxygen sensor 60. The drive circuit 55 in turn stops the operation of the solenoid valve 18 as the case in which the lean signal is applied thereto. With the unoperated solenoid valve 18, the atmospheric pressure is supplied to the vacuum chamber 16a of the air control valve 16, and the air intake side secondary air passage 11 is closed. Thus, the feedback control of the air-fuel ratio is stopped.

Thus, in the case of the present invention, the first control pressure for opening the air control valve provided in the air intake side secondary air passage is supplied to the pressure chamber of the air control valve through the surge tank and the second control pressure for closing the air control valve is supplied to the pressure chamber of the air control valve without passing through the surge tank and the sectional area of the air intake side secondary air supply passage is gradually increased and decreased. Thus the delay of the change of the pressure in the pressure chamber due to the presence of the residual pressure in the surge tank is prevented and the speed of the opening and closing of the air control valve, especially immediatly after the switching of the control pressure, is increased as compared with the case in which the second control pressure is supplied through the surge tank.

Figure 3:
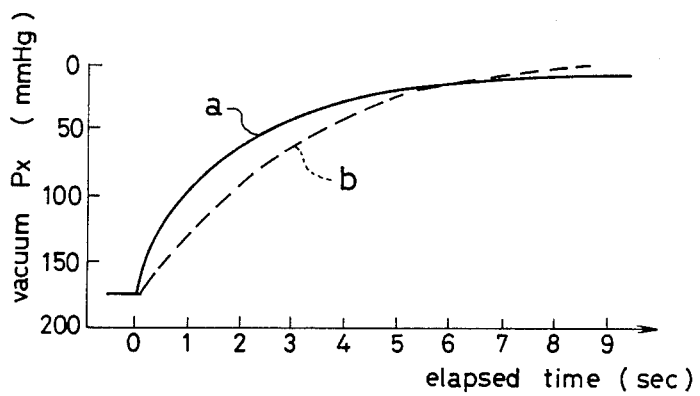
FIG. 3 is a graph showing the manner of variation of the vacuum in the pressure chamber after the start of the deceleration.

FIG. 3 shows the manner of the change of the pressure in the pressure chamber 16a of the air control valve at the time of the closing of the air control valve 16 when the engine is decelerating. As shown by the solid line a, after the application of the atmospheric pressure as the second control pressure, the vacuum Px in the pressure chamber 16a approaches to the atmospheric pressure more rapidly than in the case in which the atmospheric pressure is supplied through the surge tank, shown by the dashed line b. This is especially notable during 0 through 3 seconds after the start of the deceleration.

Figure 4:
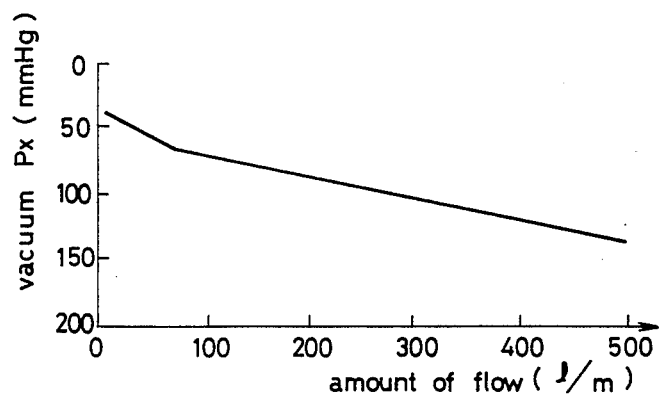
FIG. 4 is a graph showing the flow control characteristic of the air control valve.
Figure 5:
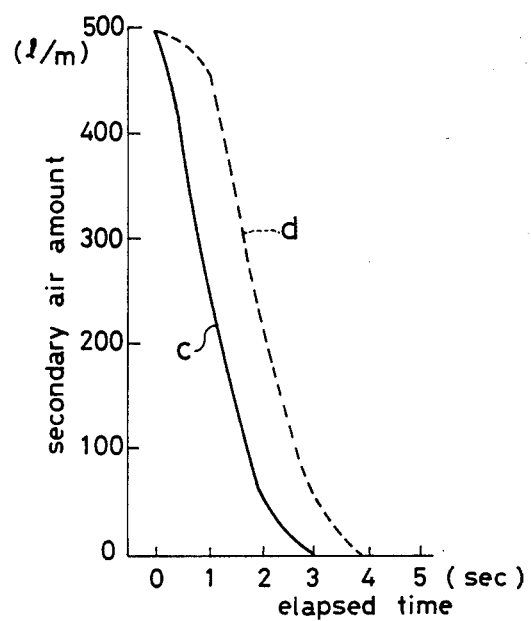
FIG. 5 is a graph showing the manner of the reduction of the amount of the secondary air after the start of the deceleration.

The amount of the secondary air under this condition will be further explained with reference to FIGS. 4 and 5. FIG. 4 shows an air flow control characteristic of the air control valve with respect to the magnitude of the vacuum Px. When the air control valve has such a control characteristic as shown in FIG. 4, the amount of the secondary air will be reduced, as shown by the solid line C of FIG. 5, more rapidly than the case in which the atmospheric pressure is supplied through the surge tank, which is shown by the dashed line d.

It will be appreciated from the foregoing, the present invention provides an air intake side secondary air supply system is provided in which the speed of the opening and closing of the air control valve is raised by alleviating the effect of the surge tank. Thus, the generation of over-lean air fuel ratio at the time of the start of the deceleration of the engine which may cause the engine stall is prevented.

What is claimed is:

1. An air intake side secondary air supply system for an internal combustion engine having a carburetor with a throttle valve, comprising:
an air-fuel ratio detection means for detecting an air-fuel ratio from an oxygen concentration of an exhaust gas of the engine and for producing an air-fuel ratio signal;
an air intake side secondary air passage leading to the carburetor on the downstream side of the throttle valve;

an air control valve having a pressure chamber and disposed in said air intake side secondary air passage, for varying a sectional area of said air intake side secondary air passage in response to a magnitude of a fluid applied to said pressure chamber;

a source of first control pressure for generating a first control pressure for opening said air control valve;

a source of second control pressure for generating a second control pressure for closing said air control valve; and a pressure supply means for selectively supplying one of said first control pressure and said second control pressure to said pressure chamber in accordance with said air-fuel ratio signal, for gradually increasing and decreasing said sectional area, wherein said pressure supply means includes a first pressure supply passage and a second pressure supply passage, a surge tank provided in said first pressure supply passage, and said first pressure supply passage is a one-way pressure supply passage for directing only said first control pressure to said pressure chamber, and said second pressure passage is a one-way pressure supply passage for directing only said second control pressure.

2. An air intake side secondary air supply system as set forth in claim 1, wherein said first pressure supply passage is provided with a first non-return valve between said pressure supply means and said surge tank for directing only said first control pressure to said pressure chamber, and said second pressure supply passage is provided with a second non-return valve for directing only said second control pressure to said pressure chamber.

* * * * *